United States Patent
Song

(10) Patent No.: US 7,935,904 B2
(45) Date of Patent: May 3, 2011

(54) KEYPAD ASSEMBLY

(75) Inventor: Sung-Hoon Song, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 850 days.

(21) Appl. No.: 11/869,543

(22) Filed: Oct. 9, 2007

(65) Prior Publication Data

US 2008/0094373 A1    Apr. 24, 2008

(30) Foreign Application Priority Data

Oct. 19, 2006 (KR) .................. 10-2006-0101639

(51) Int. Cl.
*H01H 13/70* (2006.01)

(52) U.S. Cl. ......... 200/310; 200/5 A; 200/512; 200/314; 200/317

(58) Field of Classification Search ............... 178/18.03; 200/5 A, 5 R, 512, 517, 600, 310–317, 341; 341/22, 23, 33, 34; 345/168–170, 173, 176; 708/146; 379/433.07, 368
See application file for complete search history.

(56) References Cited

U.S. PATENT DOCUMENTS

| | | | | |
|---|---|---|---|---|
| 5,669,486 A * | 9/1997 | Shima | ........................... | 200/314 |
| 6,198,060 B1 * | 3/2001 | Yamazaki et al. | ............ | 200/305 |
| 6,960,733 B2 * | 11/2005 | Hanahara et al. | ............. | 200/314 |
| 7,005,595 B1 * | 2/2006 | Tang | .............................. | 200/310 |
| 7,151,528 B2 * | 12/2006 | Taylor et al. | .................. | 345/168 |
| 7,279,647 B2 * | 10/2007 | Philipp | ......................... | 200/5 R |
| 7,444,163 B2 * | 10/2008 | Ban et al. | .................... | 455/550.1 |
| 7,656,314 B2 * | 2/2010 | Muranaka et al. | .............. | 341/22 |
| 7,772,507 B2 * | 8/2010 | Orr et al. | ....................... | 200/5 R |
| 2002/0049070 A1 * | 4/2002 | Bick | .............................. | 455/550 |
| 2004/0049070 A1 * | 3/2004 | Overkamp et al. | ............... | 562/4 |
| 2005/0275567 A1 * | 12/2005 | DePue et al. | ..................... | 341/32 |
| 2006/0087829 A1 * | 4/2006 | Manico et al. | .................. | 362/84 |

FOREIGN PATENT DOCUMENTS

| | | |
|---|---|---|
| EP | 1 197 835 | 4/2002 |
| KR | 2020040018262 | 3/2004 |
| KR | 1020040035058 | 4/2004 |
| KR | 1020060082216 | 7/2006 |

* cited by examiner

*Primary Examiner* — Michael A Friedhofer
(74) *Attorney, Agent, or Firm* — The Farrell Law Firm, P.C.

(57) ABSTRACT

Provided is a keypad assembly used as a data input unit in various electronic devices. The keypad assembly includes a main board having one or more metal domes formed at predetermined positions on the main board, and a keypad disposed on the main board to apply a pressure on the metal dome and to be used as a touchpad according to a mode selection, the keypad includes a keytop layer having one or more keytops on which corresponding alphanumeric characters are formed, a touchpad layer disposed under the keytop layer; and a base layer disposed under the touchpad layer, and having one or more protrusions protruding from its bottom surface at the positions corresponding to the metal dome.

16 Claims, 5 Drawing Sheets

KEYPAD ASSEMBLY

PRIORITY

This application claims priority under 35 U.S.C. §119 to an application filed in the Korean Intellectual Property Office on Oct. 19, 2006 and assigned Serial No. 2006-101639, the contents of which are incorporated herein by reference.

BACKGROUND OF THE INVENTION

1. Field of the Invention

The present invention relates generally to a keypad assembly used as a data input unit in various electronic devices, and in particular, to a keypad assembly for selectively operating in a mechanical metal dome mode or a capacitive touchpad mode while achieving a reduction in volume.

2. Description of the Related Art

Electronic devices, in particular, portable electronic devices include a keypad assembly having one or more keytops as a data input unit. A user conveniently inputs alphanumeric or symbol characters and selects a desired function using the keypad assembly.

Recently introduced electronic devices have a variety of functions and become smaller, lighter, and slimmer in order to meet a user's demand. Accordingly, the keypad assembly has also become smaller, lighter, and slimmer while performing an equal or better function. In particular, in a mobile terminal the improvement of the keypad assembly is necessary.

A structure for a mechanical metal dome mode as an operational mode of the keypad assembly is constructed as follows: one or more metal domes are attached at predetermined contact points on a Printed Circuit Board (PCB) or a Flexible Printed Circuit Board (FPCB), a silicon keypad rubber with a predetermined thickness, on which corresponding protrusions are formed, is stacked on the PCB or the FPCB, and a keypad sheet or keybuttons are attached on the silicon keypad rubber.

A structure for a capacitive touchpad mode as an other operational mode of the keypad assembly is constructed as follows: films having corresponding electrodes cross each other on a FPCB to form a coordinate system, and a dielectric layer is interposed between the films. Accordingly, when a user touches the keypad assembly using the structure, capacitance at the touched position is changed, such that corresponding data are input by detecting the capacitance change.

Recently, a new keypad assembly for allowing the selection of the mechanical metal dome mode or the touchpad mode is introduced. For example, it is configured by stacking the structure for the touchpad mode on the structure for the mechanical metal dome mode and one of two modes is selectively used according to a user's selection.

In the structure described above, the structure for the mechanical metal dome mode is stacked on a PCB, a capacitive touchpad is stacked on the structure for the mechanical metal dome mode, and a keypad is stacked on the touchpad. Accordingly, the whole thickness of the keypad assembly having the above structure is increased, and an air gap generated between the keypad and the touchpad significantly degrades touch sensitivity and causes the keypad assembly to malfunction.

SUMMARY OF THE INVENTION

An object of the present invention is to substantially solve at least the above problems and/or disadvantages and to provide at least the advantages below. Accordingly, an aspect of the present invention is to provide a keypad assembly having an integrated keypad and touchpad, thereby preventing air gap and improving touch sensitivity.

Another aspect of the present invention is to provide a keypad assembly having an integrated keypad and touchpad instead of a separate touchpad and a separate keypad, thereby obtaining efficient assembly.

Still another aspect of the present invention is to provide a keypad assembly having an integrated keypad and Electro-Luminescence (EL) sheet, wherein the EL sheet acts as a touchpad, thereby resulting in slimmer mobile terminals.

According to one aspect of the present invention, a keypad assembly including a main board having one or more metal domes formed at predetermined positions on the main board; and a keypad disposed on the main board, for applying a pressure on the metal dome and being used as a touchpad according to a mode selection, wherein the keypad including a keytop layer having one or more keytops, on which predetermined alphanumeric characters are formed; a touchpad layer disposed under the keytop layer; and a base layer disposed under the touchpad layer, the base layer having one or more protrusions protruding from the bottom surface of the base layer at the position corresponding to the metal dome.

According to the present invention, a separate Flexible Printed Circuit Board (FPCB) for a touchpad is not required so that an air gap between the touchpad and a keypad is not created and efficient assembly is obtained.

In the present invention, a touchpad is integrated into a keypad in order to solve the above conventional problems. Preferably, the touchpad is interposed in the middle of the keypad to improve touch sensitivity.

According to the present invention, a capacitive EL sheet disposed in a keypad layer is used as a touchpad. The capacitive EL sheet is formed by stacking a conductive layer and a non-conductive layer alternately. A predetermined voltage is applied to the conductive layers such that the capacitive EL sheet emits light. In addition, when the conductive layers of the capacitive EL sheet are used as a top and bottom electrodes of a conventional touchpad, and an appropriate voltage is applied to the conductive layers in order to generate a predetermined capacitance, the capacitive EL sheet operates as the touchpad.

According to the present invention, a pattern for a touchpad may be formed using the capacitive EL sheet. When there is enough space for the pattern, the pattern may be formed in a lattice configuration for a touch or in a grid configuration for a drag. In addition, the pattern may be formed using both the lattice configuration and the grid configuration such that a user can select a data input mode.

According to the present invention, a predetermined luminescent unit is applied to the keypad assembly in order to improve the visibility of keybuttons. One or more light emitting diodes installed on a Printed Circuit Board (PCB) or a backlight EL sheet additionally disposed in the keypad may be used as the luminescent unit.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Although a keypad assembly according to the present invention will be applied to a mobile terminal herein, the keypad assembly can be properly applied to an electronic device having a data input unit.

Figure 1:
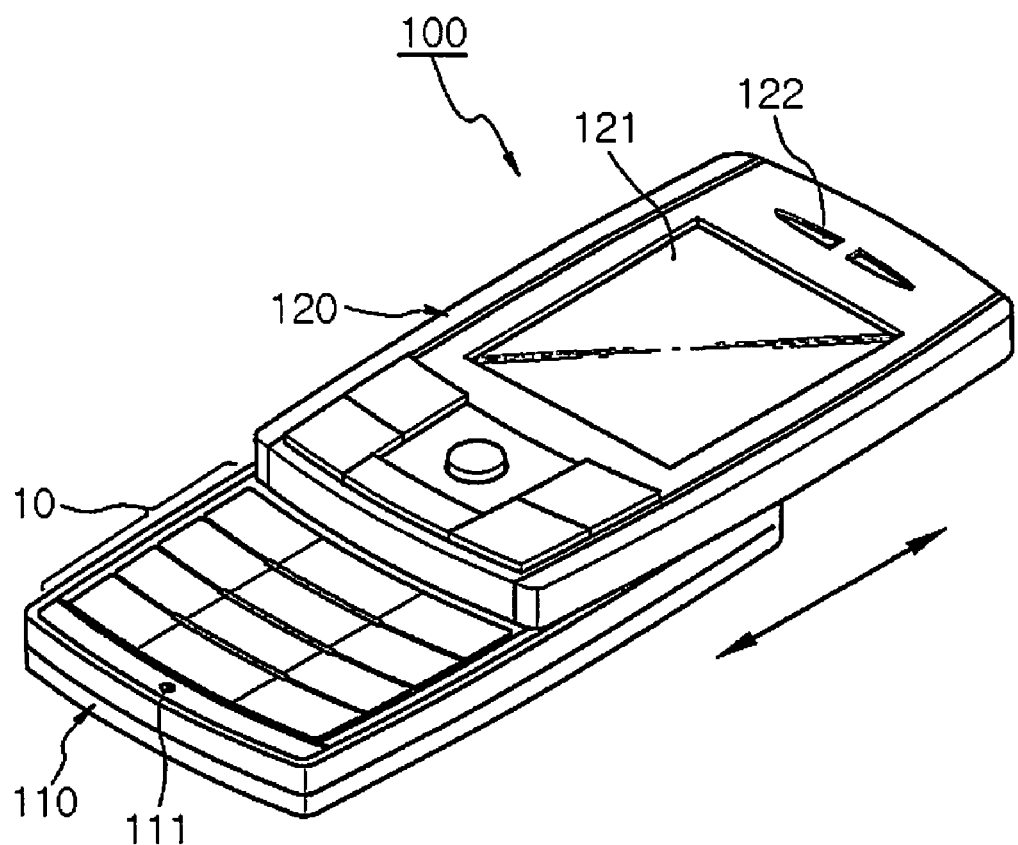
FIG. 1 is a perspective view of a mobile terminal including a keypad assembly according to the present invention.

Referring to FIG. 1, a slide type mobile terminal 100 includes a main body 110 and a slide body 120 sliding on the main body 110 in a lengthwise direction of the mobile terminal 100. A display unit 121 is installed on the slide body 120. A speaker 122 acting as a receiver is installed above the display unit 121. A keypad assembly 10 according to the present invention is installed on the main body 110. A microphone 111 acting as a transmitter is installed below the keypad assembly 10.

According to the present invention, a controller controls the keypad assembly 10 to operate in a mechanical metal dome mode or in a touchpad mode according to a user's mode selection. Thus, the user can select the mechanical metal dome mode or the touchpad mode.

Figure 2:
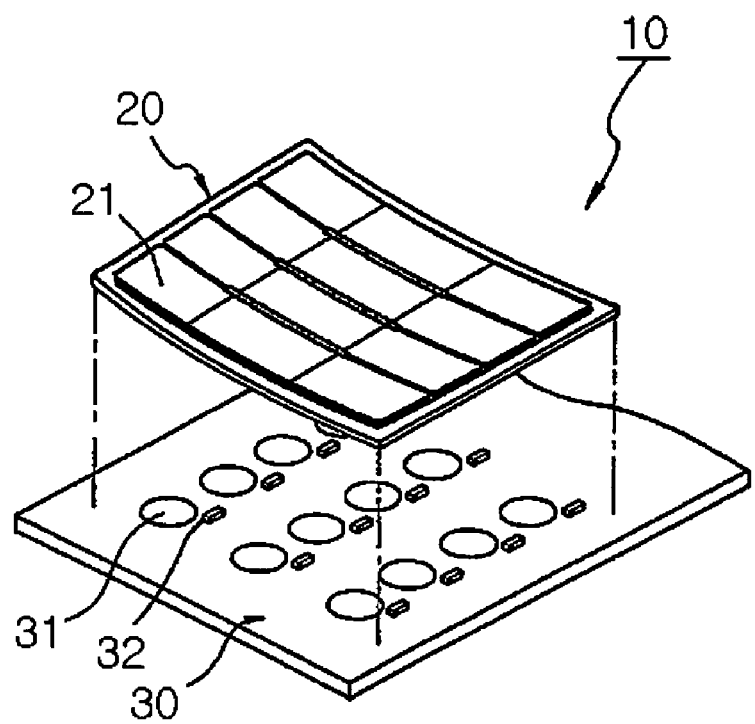
FIG. 2 illustrates essential parts of a keypad assembly according to the present invention.

FIG. 2 illustrates a main board 30 and a keypad 20 disposed on the main board 30. The main board 30 may be a Flexible Printed Circuit Board (FPCB) or a general hard type Printed Circuit Board (PCB).

The keypad 20 may have one or more keytops 21 protruding therefrom in the upward direction with alphanumeric characters formed on the keytop 21. One or more metal domes 31 are formed on the main board 30 at the position corresponding to the protruding keytop 21. Thus, in the mechanical metal dome mode, a switching operation can be performed by pressing the keytop 21. One or more Light Emitting Diodes (LED) 32 are installed at the peripheral region of the metal dome 31 on the main board 30. The LED 32 provides light to the keytop 21, thereby improving the visibility of keybuttons. Also, light may be provided to the keytop 21 by installing 2 to 4 groups (not illustrated in FIG. 2) of the LED 32 at both edges of the main board 30 and additionally a light guide unit. For example, a light guide film, which is interposed between the keypad 20 and the main board 30, may be used as the light guide unit.

Figure 3:
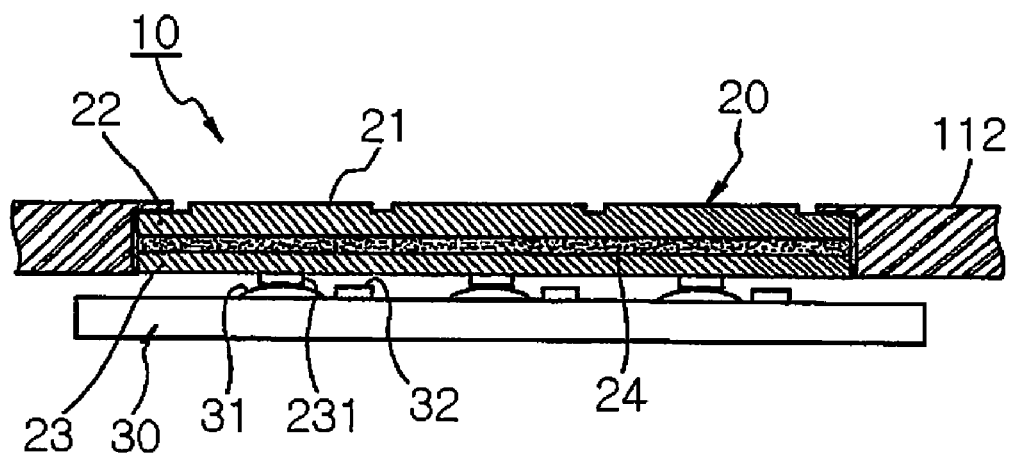
FIG. 3 is a cross sectional view of a keypad assembly according to the present invention.

Referring to FIG. 3, a main board 30 is installed in a mobile terminal 100. A keypad 20 according to the present invention is disposed on the main board 30. In addition, the keypad 20 may be disposed to be supported by a mobile terminal case frame 112.

As described above, one or more metal domes 31 are formed on the main board 30 at the positions corresponding to one or more keytops 21 of the keypad 20. Also, one or more LEDs 32 in surface mounted device (SMD) type may be installed at the peripheral region of the metal dome 31.

Thereafter, the keypad 20 is disposed on the main board 30. The keypad 20 includes a keytop layer 22 having the keytop 21, a touchpad layer 24 disposed under the keytop layer 22, and a base layer 23 disposed under the touchpad layer 24. The keytop layer 22, the touchpad layer 24, and the base layer 23 are bonded by an adhesive to act as the single keypad 20. The keytop layer 22 may be formed of lightweight material to improve touch sensitivity. For example, the keytop layer 22 may be formed of polyethylene terephthalate resin (PET) or polyethylene naphthalate resin (PEN). One or more protrusions 231 are formed on the bottom surface of the base layer 24 at the position corresponding to the metal dome 31 to press the metal dome 31. The base layer 23 may be formed of soft material such as polyurethane or silicon material in order to improve the touch sensitivity. Moreover, the base layer 23 may be formed of transparent or semitransparent material in order to guide light of the LED 32 installed under the base layer 23 to the keytop 21.

The touchpad layer 24 may be formed of a known Electro-Luminescence (EL) sheet. The EL sheet is formed by stacking a conductive layer and a non-conductive layer alternately.

A predetermined voltage is applied to the conductive layers such that the EL sheet emits light. Accordingly, a top and bottom conductive layers of the EL sheet may be used as a top and bottom electrodes of a conventional touchpad by controlling the voltage applied to the top and bottom conductive layers. Therefore, the EL sheet may be used as the touchpad. Preferably, a capacitance generated by the voltage applied to the top and bottom conductive layers may be 20~30 pF.

Figure 4:
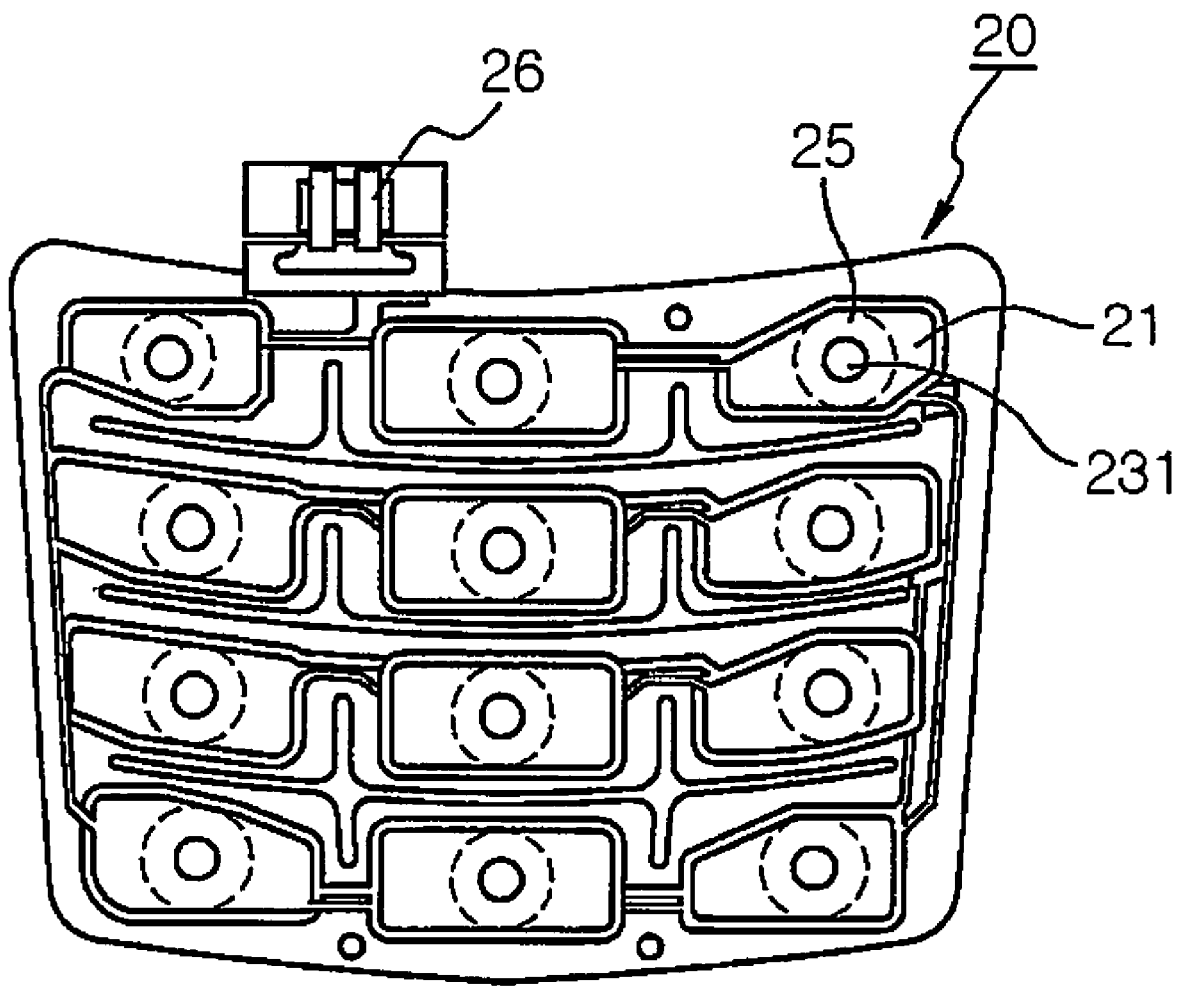
FIG. 4 is a plan view of the keypad assembly shown in FIG. 3 according to the present invention.

FIG. 4 is a plan view of the keypad shown in FIG. 3 according to the present invention. A connector 26 is disposed at a predetermined position on the top surface of the keypad 20. The electrode pattern of the EL sheet 24 for touch is electrically connected to the connector 26, and the connector 26 may be electrically connected to the main board 30. Hereinafter, the EL sheet for touch is referred as a touch EL sheet. No pattern is formed at the peripheral region of the keytop 21 of the touch EL sheet 24 in order to guide light of the LED 32 installed under the base layer 23 to the keytop 21. As shown in FIG. 4, a guiding portion 25, where no pattern is formed, may be formed in a circular shape encircling the protrusion 231.

Moreover, a top and bottom electrode patterns formed on the touch EL sheet 24 may be formed in a lattice pattern for a touch type input or in a grid pattern for a drag type input.

Accordingly, when a user selects the touchpad mode or the mechanical metal dome mode using a mode selection button, a controller can perform a switching operation corresponding to the selected mode. For example, when the mechanical metal dome mode is selected, a switching operation is performed by the user's pressing a keytop such that a pressure is applied on a corresponding metal dome. Similarly, when the touchpad mode is selected, a switching operation is performed by the users simply touching a keytop with his finger.

Figure 5:
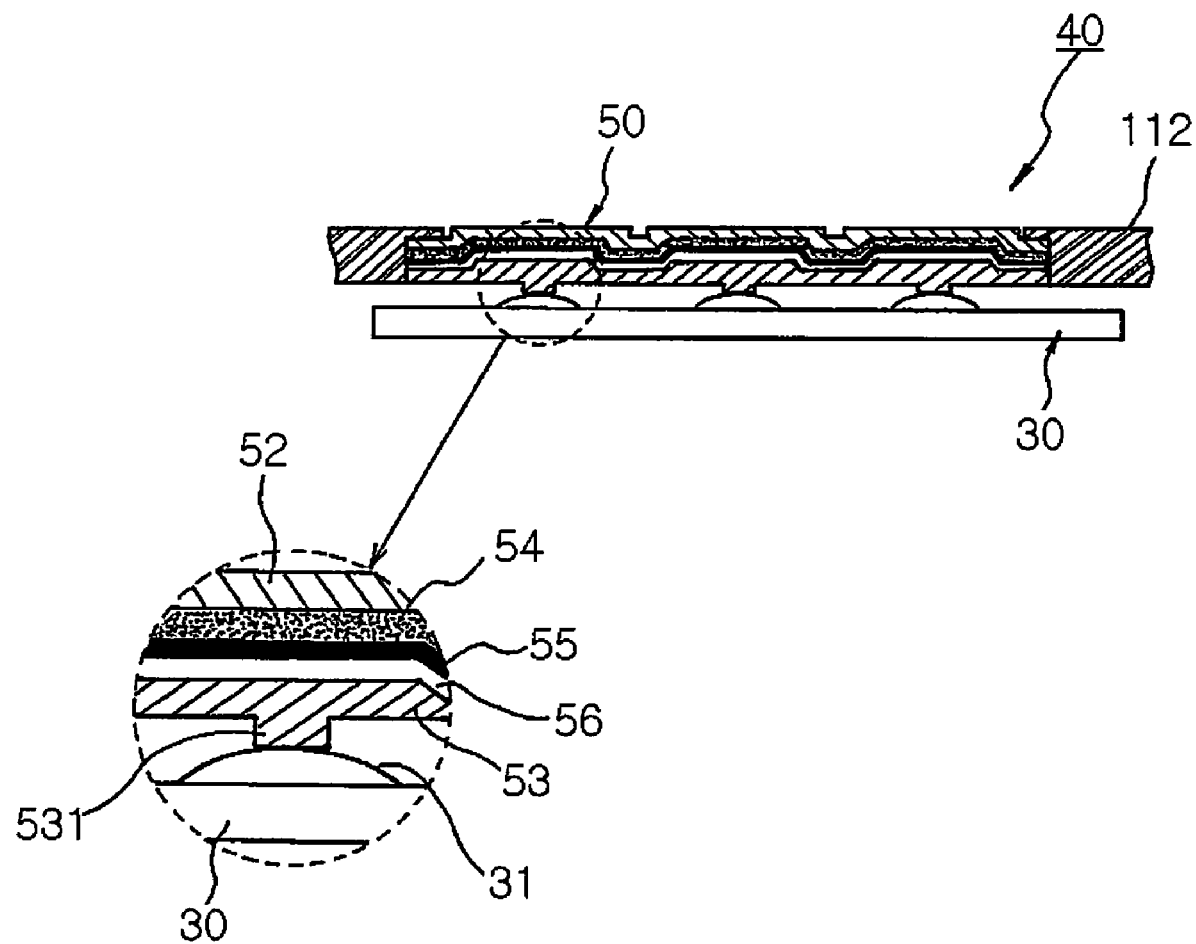
FIG. 5 is a cross sectional view of a keypad assembly according to the present invention.

FIG. 5 is a cross sectional view of a keypad assembly 40 according to the present invention. An EL sheet 56 for backlight instead of a LED is used as a luminescent unit. Hereinafter, the EL sheet for backlight is referred as a backlight EL sheet. As shown in FIG. 5, the backlight EL sheet 56 may be interposed between a keytop layer 52 and a base layer 53 having a protrusion 531. A barrier film 55 is interposed between the backlight EL sheet 56 and a touch EL sheet 54 to prevent interference between them. Any known film can be used as the barrier film 55. The barrier film 55 may be formed of transparent or semitransparent material in order to guide light of the backlight EL sheet 56 to the keytop layer 52.

Figure 6:
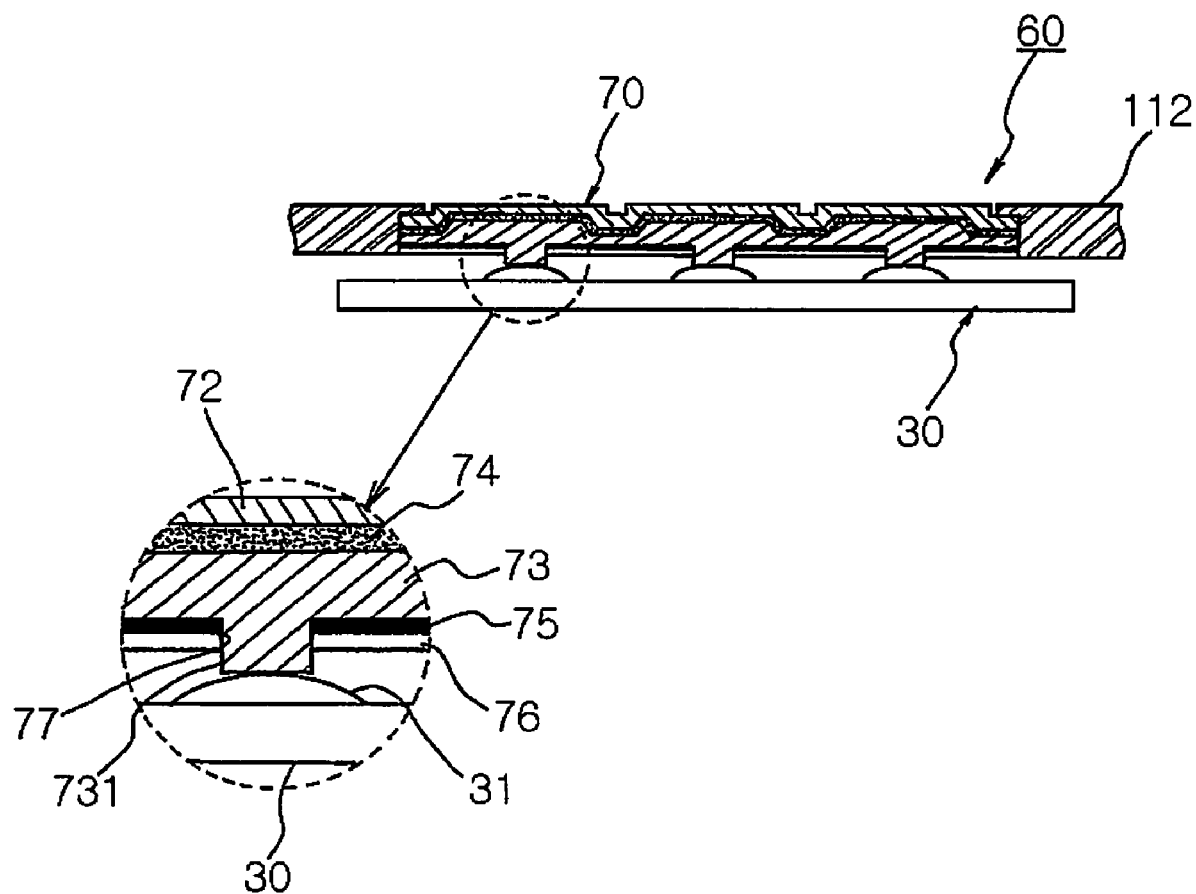
FIG. 6 is a cross sectional view of an other keypad assembly according to the present invention.

FIG. 6 is a cross sectional view of a keypad assembly 60 according to the present invention. Similarly, a backlight EL sheet 76 instead of a LED is used as a luminescent unit. As shown in FIG. 6, the backlight EL sheet 76 is disposed under a base layer 73 having a protrusion 731. A barrier film 75 is also interposed between the backlight EL sheet 76 and a base layer 73 to prevent interference between the backlight EL sheet 76 and a touch EL sheet 74. Any known film can be used as the barrier film 75. Similarly, the barrier film 75 may be formed of transparent or semitransparent material in order to guide light of the backlight EL sheet 76 to the keytop layer 72. Moreover, the barrier film 75 and the backlight EL sheet 76 may have a through hole 77, and may be disposed in order that the protrusion 731 of the base layer 73 may penetrate the through hole 77.

In the keypad assembly according to the present invention, because the touchpad layer is integrated into the keypad, an air gap is avoided so that touch sensitivity is improved and malfunction of mobile terminal is prevented. In addition, the keypad assembly reduces the volume of the mobile terminal by slimming the mobile terminal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A keypad assembly comprising:
   a main board having at least one metal dome disposed on a predetermined position of the main board; and
   a keypad disposed on the main board, for applying a pressure on the at least one metal dome and being used as a touchpad according to a mode selection,
   wherein the keypad includes:
   a keytop layer having at least one keytop on which a plurality of predetermined alphanumeric characters is stamped;
   a touchpad layer disposed under the keytop layer;
   a base layer disposed under the touchpad layer, the base layer having at least one protrusion protruding from a bottom surface of the base layer at a position corresponding to the at least one metal dome; and
   a backlight Electro-Luminescence (EL) sheet interposed between the base layer and the touchpad layer to provide light to the at least one keytop and a barrier film provided to prevent interference between the backlight EL sheet and the touchpad layer.

2. The keypad assembly of claim 1, wherein a touch EL (Electro-Luminescence) sheet is used as the touchpad layer, the touch EL sheet including a non-conductive layer, a top conductive layer disposed above the non-conductive layer, and a bottom conductive layer disposed under the non-conductive layer, a predetermined voltage being applied to the top conductive layer and the bottom conductive layer and the top conductive layer and the bottom conductive layer operating as a top electrode and a bottom electrode.

3. The keypad assembly of claim 2, wherein the predetermined voltage applied to the top conductive layer and the bottom conductive layer generates a capacitance of 20 to 30 pF.

4. The keypad assembly of claim 3, wherein the keytop layer is formed of one of a PET (PolyEthylene Terephthalate resin) and a PEN (PolyEthylene Naphthalate resin) materials, and the base layer is formed of one of a transparent and semitransparent materials including one of a polyurethane and silicon materials.

5. The keypad assembly of claim 4, wherein a top electrode pattern and a bottom electrode pattern are formed on the EL sheet and in one of a lattice pattern for a touch input and a grid pattern for a drag input.

6. The keypad assembly of claim 4, further comprising a backlight EL sheet disposed under the base layer to provide light to the at the least one keytop through the base layer and a barrier film interposed between the base layer and the backlight EL sheet to prevent interference between the backlight EL sheet and the touch EL sheet.

7. The keypad assembly of claim 6, wherein the barrier film and the backlight EL sheet have a through hole so that the at least one protrusion of the base layer penetrates the through hole.

8. The keypad assembly of claim 7, wherein a peripheral region of the at least one keytop on the touch EL sheet is free of an electrode pattern in order to guide light of the backlight EL sheet to the at least one keytop.

9. The keypad assembly of claim 7, wherein the keytop layer, the touchpad layer, the base layer, the barrier film, and the backlight EL sheet are stacked and bonded by an adhesive.

10. The keypad assembly of claim 6, wherein a peripheral region of the at least one keytop on the touch EL sheet is free of an electrode pattern in order to guide light of the backlight EL sheet to the at least one keytop.

11. The keypad assembly of claim 4, further comprising a backlight EL sheet disposed under the base layer to provide light to the at the least one keytop through the base layer and a barrier film interposed between the base layer and the touch EL sheet to prevent interference between the backlight EL sheet and the touch EL sheet.

12. The keypad assembly of claim 11, wherein a peripheral region of the at least one keytop on the touch EL sheet is free of an electrode pattern in order to guide light of the LED to the at least one keytop.

13. The keypad assembly of claim 11, wherein the keytop layer, the touchpad layer, the base layer, the barrier film, and the backlight EL sheet are stacked and bonded by an adhesive.

14. The keypad assembly of claim 2, wherein a peripheral region of the at least one keytop on the touch EL sheet is free of an electrode pattern in order to guide light of the backlight EL sheet to the at least one keytop.

15. The keypad assembly of claim 2, wherein the keytop layer, the touchpad layer, the base layer, the barrier film, and the backlight EL sheet are stacked and bonded by an adhesive.

16. The keypad assembly of claim 1, wherein the main board is formed of one of a Flexible Printed Circuit Board (FPCB) and a hard type Printed Circuit Board (PCB).

* * * * *